United States Patent [19]
Boudreau et al.

[11] Patent Number: 5,966,486
[45] Date of Patent: Oct. 12, 1999

[54] TILTED NOTCHED FOR PASSIVE OPTICAL ALIGNMENT

[75] Inventors: Robert Addison Boudreau, Hummelstown, Pa.; Dennis Bowler, Sudbury, Mass.; Hongtao Han, Mechanicsburg, Pa.; Daniel Pulver, North Reading; John Woodhouse, Lexington, both of Mass.; Ping Zhou, Mechanicsburg, Pa.

[73] Assignees: The Whitaker Corporation, Wilmington, Del.; Lasertron Incorporated, Bedford, Mass.

[21] Appl. No.: 08/918,897

[22] Filed: Aug. 27, 1997

Related U.S. Application Data

[60] Provisional application No. 60/025,000, Aug. 29, 1996.

[51] Int. Cl.$^6$ ........................................................ G02B 6/36
[52] U.S. Cl. ................................ 385/90; 385/91; 385/89; 385/92
[58] Field of Search .......................................... 385/88–94

[56] References Cited

U.S. PATENT DOCUMENTS

| | | | |
|---|---|---|---|
| 5,077,878 | 1/1992 | Armiento et al. | 29/25.02 |
| 5,163,108 | 11/1992 | Armiento et al. | 385/89 |
| 5,173,959 | 12/1992 | Cambriello | 385/89 |
| 5,182,782 | 1/1993 | Tabasky et al. | 385/89 |
| 5,454,055 | 9/1995 | Kragl et al. | 385/88 |

*Primary Examiner*—Hung N. Ngo
*Attorney, Agent, or Firm*—Hamilton, Brook, Smith & Reynolds, P.C.

[57] ABSTRACT

A technique for passive alignment of an opto-electronic device, such as laser, by alignment fiducials to a silicon wafer board utilizes a tilted notch in the opto-electronic device. This system overcomes limitations using standard etched notches for previous passive alignment systems. Specifically, the tilted notch presents a range of offset distances between the edge of the notch and the active light-emitting spot of the laser. Depending on the location at which the wafer is diced or cleaved, the distance from the notch on the laser to the laser stripe can be adjusted after the laser wafer is fabricated.

22 Claims, 5 Drawing Sheets

TILTED NOTCHED FOR PASSIVE OPTICAL ALIGNMENT

This application claims the benefit of U.S. Provisional Application No. 60/025,000, Filed Aug. 29, 1996.

FIELD OF THE INVENTION

The present invention relates to a passive alignment technique for aligning an optoelectronic device to an optical waveguide based on silicon waferboard technology.

BACKGROUND OF THE INVENTION

Optical communications have been fostered by passive alignment techniques which eliminate a substantial portion of active alignment of an optoelectronic device to an optical waveguide. Typical examples of such alignment techniques are with a laser aligned to an optical fiber or planar waveguide. While offering a great deal of precision, active alignment is very labor intensive, and accordingly results in a very high cost end product. The desire is for a high precision alignment, without the attendant disadvantage of cost associated with active alignment. One such technique for passive alignment as a low cost replacement for active alignment is found using silicon waferboard (SWT) technology. In silicon waferboard technology, a substrate of preferably monocrystalline material is selectively etched to effect alignment fiducials as well as grooves for reception of optical fibers.

One such example of passive alignment in silicon waferboard technology is disclosed in U.S. Pat. No. 5,163,108 to Armiento et al., the disclosure of which is incorporated by reference. This reference discloses a notch for passive alignment of an optoelectronic device to alignment fiducials, pedestals and standoffs, located on the silicon waferboard substrate. Such an alignment scheme is as shown in FIG. 1. As can be seen, the alignment notch 101 on the laser bar 102 has a substantially right angle orientation. The pedestals 103 and standoffs 104 which facilitate alignment of the laser bar in the x, y plane and z direction, respectively, are also of a right angle orientation as is shown. While such an apparatus for the alignment of an optoelectronic device to an optical fiber or planar waveguide has definite merit when compared to active alignment techniques, there is a potential disadvantage due to the limitation of the precision etch. To this end, tolerances for the notch location relative to the laser mode are on the order of 0.1 to 0.2 microns for passive alignment assemblies suitable for single mode optical fiber alignment. Typically, the technology for locating etched notches in laser wafers is ±0.2 to 0.5 microns in precision at best, so it can be seen that the potential for manufacturing yield loss is great. To this end, the degree of freedom afforded the right angle notch and pedestal/standoff alignment fiducials is not great enough when compared to the required tolerances for passive alignment assemblies given the current state of precision etching techniques. Accordingly, because a single wafer of semiconductor lasers is relatively expensive, the overall cost per part is correspondingly higher as the manufacturing yield is reduced by unacceptable alignment.

What is needed is an alignment scheme in a passive manner where aligning an optoelectronic device to an optical waveguide using silicon waferboard technology has a greater degree of freedom to enable an overlap of the alignment tolerances of single mode applications with the etching precision limitations of standard technology.

SUMMARY OF THE INVENTION

The present invention relates to a technique for passive alignment of an optoelectronic device by the use of alignment fiducials on a silicon waferboard and a tilted notch in the optoelectronic device. Such a device overcomes the limitations above enumerated and further compensates for the limitations set forth by silicon waferboard technology in general. The tilted notch presents a range of offset distances between the edge of the notch and the active light emitting spot of the laser. Depending upon the location at which the wafer is diced or cleaved, the distance from the notch on the laser to the laser stripe can be adjusted after the laser wafer is fabricated. The tilted notch is fabricated to extend over most of the length of the laser chip, enabling a great degree of adjustment relative to the parameters of alignment of an optical fiber to a optoelectronic device. A preferred embodiment utilizes a sawtooth alignment notch repeating the angled notch at a prescribed distance which corresponds to the spacing between the die on the wafer. It is clear other implementations of this invention are possible which use non-sawtoothed patterns such as stair-stepped and which repeat an integer number of times over a cavity length.

The present invention envisions a single side alignment pedestal for engaging the laser notch as well as multiple side alignment pedestals for engaging the tilted notch. The single side alignment pedestal is for use with a laser die having a width greater than its length, for example in laser arrays of many elements, while that utilizing multiple side alignment pedestals has a greater applicability when the width is less than the length of the laser. Finally, the preferred embodiment is for use with the alignment of a laser to an optical waveguide, but it is clear that other optoelectronic devices to include photodetectors, optical amplifiers, photonic integrated circuits and VCSEL's could also benefit from the alignment notch described herein.

OBJECTS, FEATURES, AND ADVANTAGES

It is an object of the present invention to facilitate passive alignment of an optoelectronic device to an optical waveguide with great precision and a greater degree of freedom than previously realized.

It is a feature of the present invention to have a notch on at least one surface of an optoelectronic device, the notch having an angle relative to the end surface of the device to facilitate adjustability in the alignment of an optoelectronic device to an optical fiber.

It is an advantage of the present invention to have a high precision alignment scheme while maintaining low cost through high yield in manufacture.

DETAILED DESCRIPTION OF THE INVENTION

Figure 1:
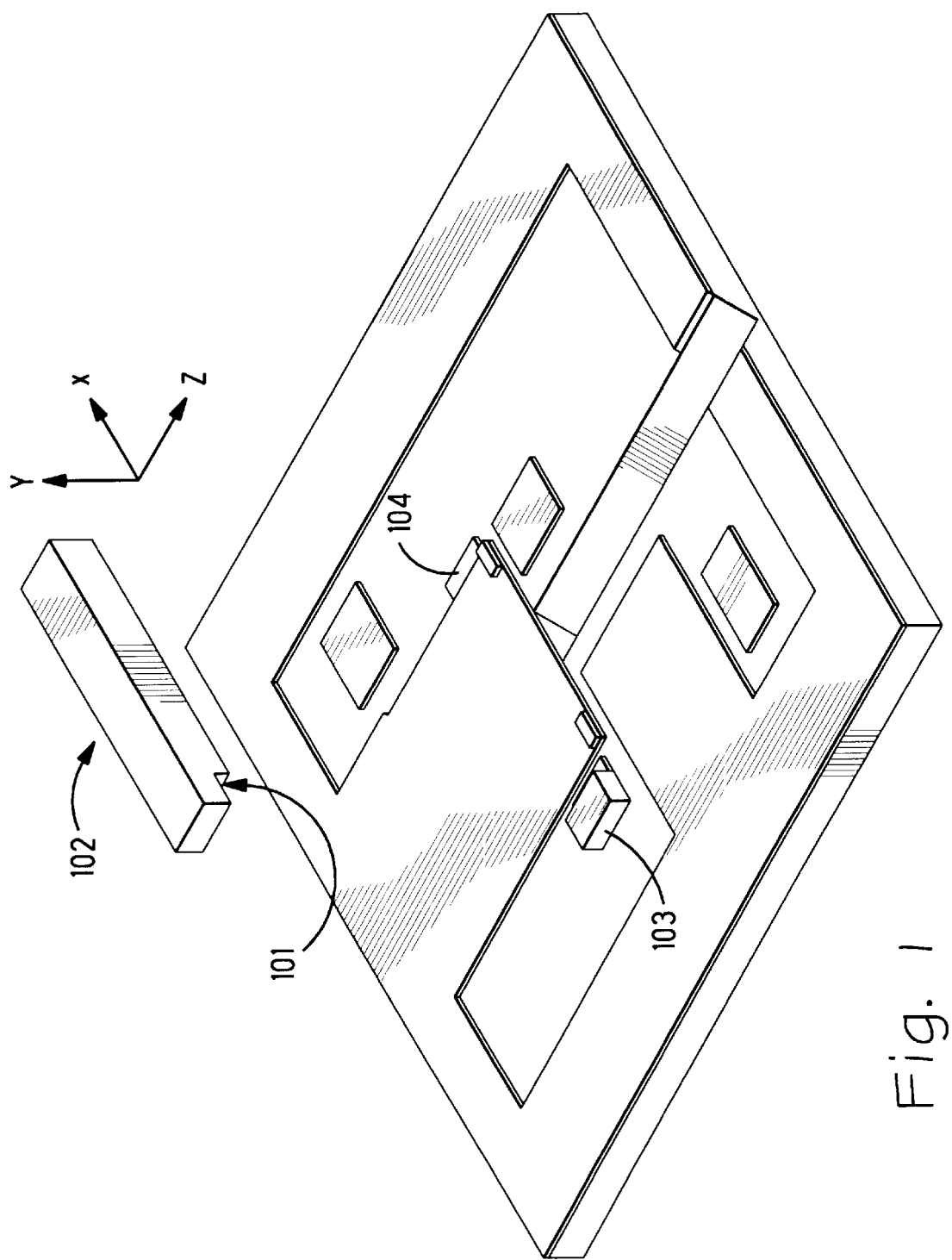
FIG. 1 is a prior art perspective view of the alignment features of an optoelectronic device to the alignment fiducials on a silicon waferboard.
Figure 2:
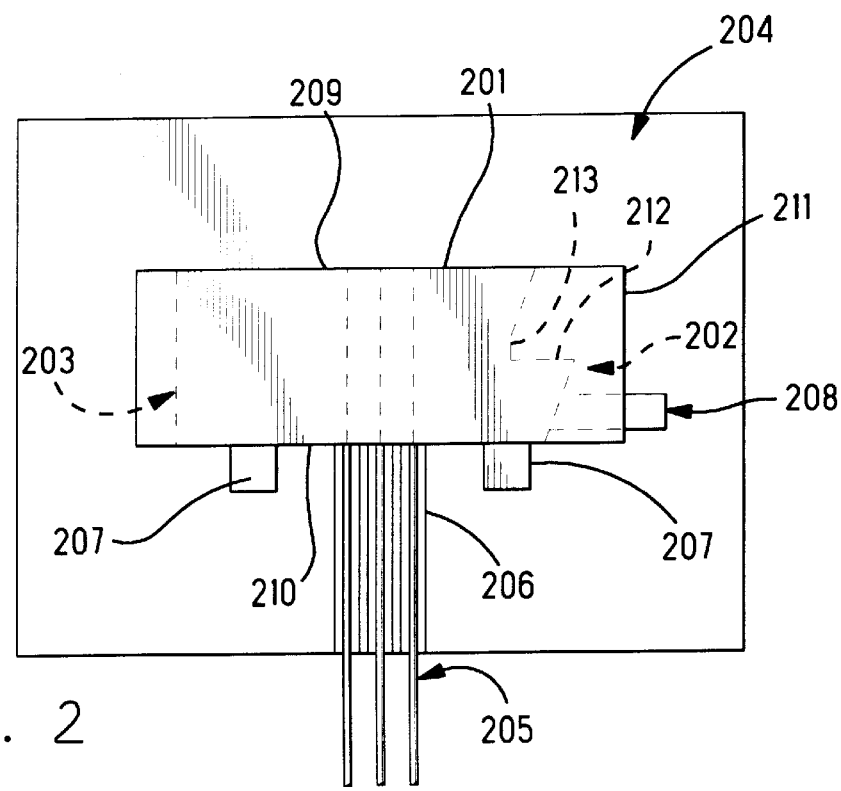
FIG. 2 is a top view of the embodiment of the present invention having a single side pedestal.

Turning to FIG. 2, we see in top view the alignment of the laser array chip 201 having an alignment notch on the underside thereof shown at 202 and a side notch of the standard right angle 203 disposed on the other side. This second alignment side notch 203 is not for mechanical registration in the present invention. A portion of the silicon waferboard 204 is shown having disposed herein the optical fibers 205 in the v-grooves 206. Furthermore, front alignment pedestals 207 as well as the side pedestal 208 for registration of the tilted notch 202 is as shown. The back laser facet edge is at 209 with the front facet of the laser shown at 210. The present invention embodies the use of the tilted notch for registration. The tilted notch is etched using etching techniques well known to one of ordinary skill in the art.

The preferred embodiment uses a single photolithographic step to define the laser stripe and notch in a silicon nitride masking layer. The notch is protected and the ridge waveguide (RWG) laser structure is formed using standard fabrication techniques. The notch protection is removed, the RWG structure is protected, and the notch is then etched with dry and wet etching processes.

Many other processing options are clearly possible which include but are not limited to: independent photolithographic masks for laser and notch definition, non-RWG laser structures, other masking techniques, laser and notch formation in any order or simultaneously, and any combination of dry etching, wet etching or milling processes.

The v-grooves are etched by standard technique as is described in U.S. Pat. No. 4,210,923 to North et al. Furthermore, the front alignment pedestals 207 as well as the side alignment pedestal 208 are fabricated by a variety of possible techniques as are disclosed in the above referenced patent as well as U.S. Patent Application Nos. (Han and Tan references on polyimide free processes) the disclosures of which are specifically incorporated herein by reference. As described above, the present invention having a single side pedestal as is shown in FIG. 2 is usually utilized when the tip of the laser has a width that is greater than its length making it necessary to engage only the side of the chip with a single side pedestal to provide positioning without losing the rotational control of the chip during placement and die bonding.

As can be well appreciated, the pedestals both front and side provide planar restraint in the plane of the silicon waferboard, while the standoffs provide z-axis height registration. The laser chip or other optoelectronic device is positioned on the silicon waferboard surface by registration of the edges to the alignment pedestals that protrude upwardly from the surface shown in relief in FIG. 2. There are two front alignment pedestals 207 which engage the front of the laser while one pedestal 208 registers the tilted notch edge.

Typically, the notch angle of the tilted notch is on the order of 0.6 degrees measured from a line parallel to the edge of the laser chip 211, and accordingly FIG. 2 is not geometrically to scale. The typical laser chip having laser cavity length on the order of 300 microns would therefore be adjustable in the range of approximately ±1 micron in the distance from the laser array elements to the side alignment pedestals depending upon where the laser is cleaved for its back and front facets when cleaved from the laser wafer. The sawtooth feature of the tilted notch provides for relative measurement and provides for a repetition of the angled notch pattern in the laser chip fabrication wafer. The relative measurement is effected by the use of flats 212 and 213 on the sawtoothed notch 202. Because the notch is tilted, flat surfaces are needed as reference points on where to cut the die. That is to say, standard dimension indicators are provided by the flat surfaces for calculation of where to cleave the die.

Figure 3:
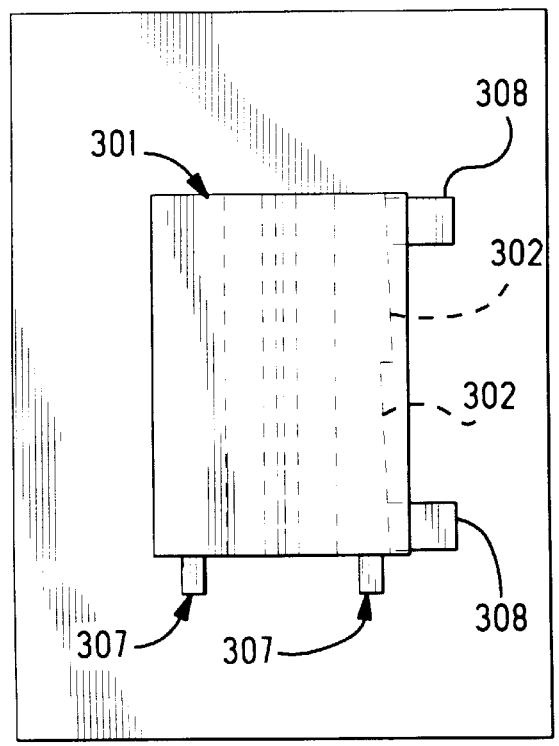
FIG. 3 is a top view of the present invention having multiple alignment side pedestals.
Figure 4:
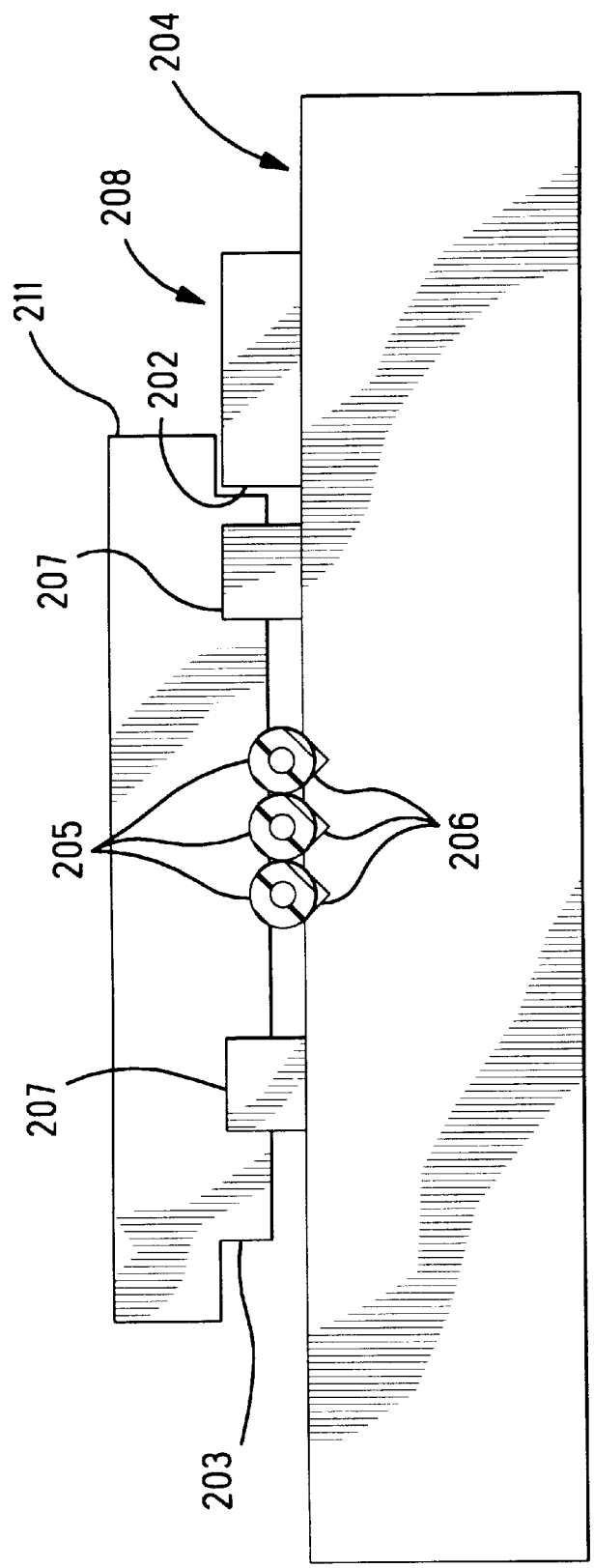
FIG. 4 is a side view of the structure of FIG. 2.

The second embodiment of the present invention is similar to the first, but is used for the cases in which the chip die has a length greater than its width. Shown in top view in FIG. 3, the laser 301 has the tilted notch 302 with alignment pedestals for engagement of the tilted notch shown at 308. The front alignment pedestals 307 are similar to those shown in FIG. 2. As can be seen in FIG. 3, the tilted notch adjustment can be done using the two alignment pedestals at 308 due to the parallel arrangement between the two portions of the sawtooth tilt notch. As the lasers are cleaved from the laser wafer having front and back facets at different starting and ending points relative to the position at the notch, the offset position of the laser stripe can be adjusted strictly by the cleave location. Accordingly, adjustability is realized and alignment of the optoelectronic device to the optical waveguide is readily accomplished through standard technique. When two side pedestals are used, separated tilted notch edge segments on the chip are utilized. Because the notch segments are parallel to one another, they adjust equally preventing angular rotation of the chip. In alignment, the sawtooth must remain located between the two side alignment pedestals, thereby the adjustable range is limited as a function of the slope of the tilt of the notch as well as the spacing of the two side pedestals.

Figure 5A:
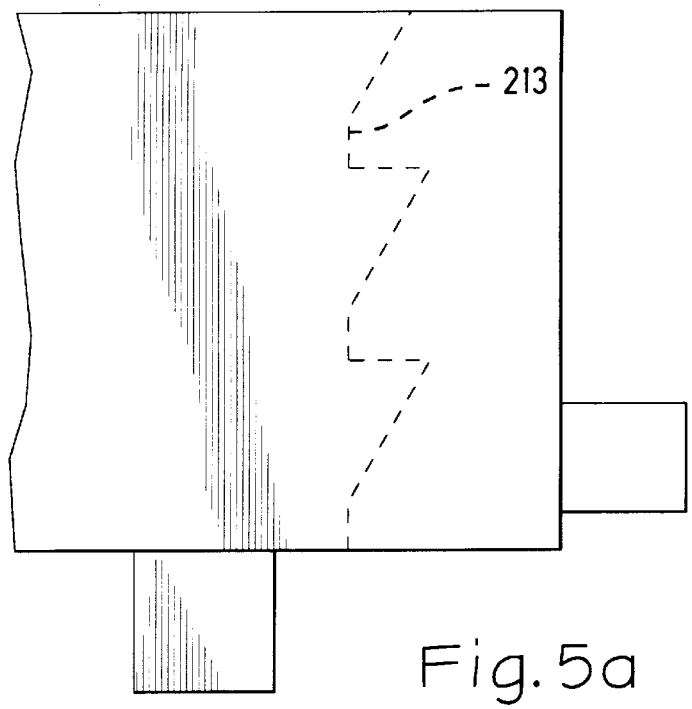
FIG. 5a is an enlarged view of the notch of FIG. 2.
Figure 5B:
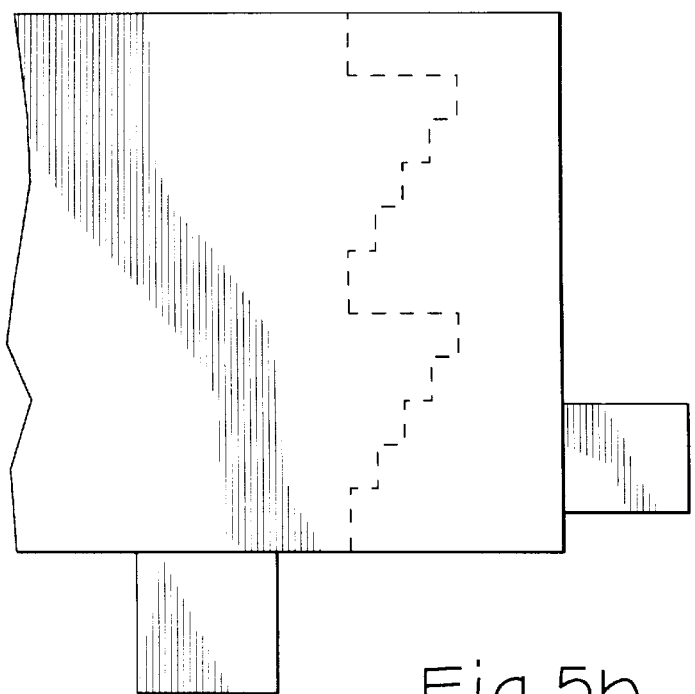
FIG. 5b is a top view of a "stair-stepped" notch.
Figure 5C:
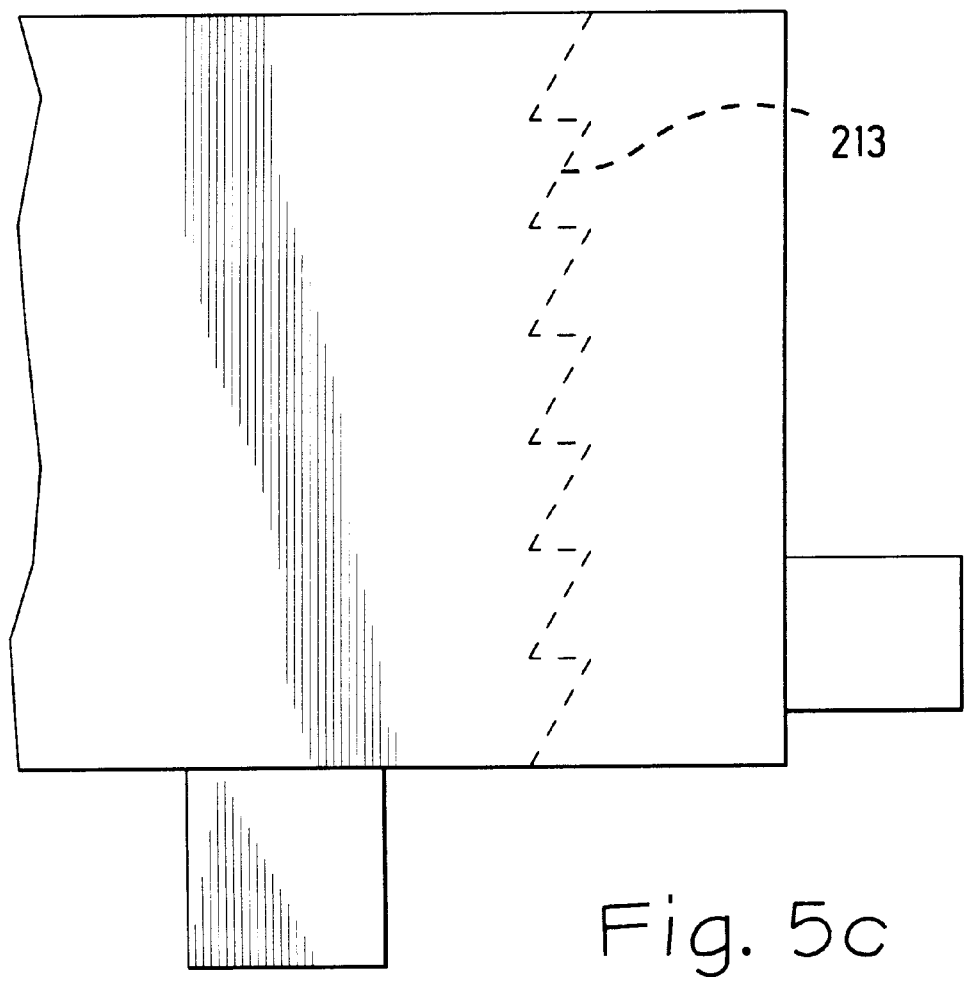
FIG. 5c is a view of a notch having multiple repetitions for a given cavity length.

As was described herein above, there are modifications and variations to the present disclosure which would be readily apparent upon review of the present disclosure to one of ordinary skill in the art. To this end, it is clear that other optoelectronic devices beside lasers could be aligned with the adjustability of the present invention by virtue of a tilt in the alignment notch. Other notch patterns can be employed to achieve variable lateral offsets as a function of cleave location such as stair-stepped patterns shown in FIG. 5b and patterns that repeat one or more times over the laser cavity length as shown in FIG. 5c. Furthermore, there are other types of waveguides to include planar waveguides, passive optical elements, as well as optical fibers that would benefit from such an alignment scheme. Finally, while the use of monocrystalline silicon waferboard as the substrate as well as the material from which the alignment pedestals and standoffs is fabricated, other materials as described in the above referenced patent applications and patents are readily employed in the use of the present invention. To the extent that such modifications and variations are within the teachings of the tilted notch for ready adjustability and passive alignment of an optoelectronic device to an optical waveguide, such are deemed within the scope and purview of the present invention.

We claim:

1. An apparatus for aligning an optoelectronic device to an optical waveguide, comprising:

a substrate having at least one front and at least one side alignment pedestal said front and said side alignment pedestals disposed on a top surface of a substrate; optoelectronic device having a front surface and a side surface; and a notch disposed on said side surface, said notch being at a non parallel angle relative to an edge of said side surface.

2. An alignment apparatus as recited in claim 1 wherein said side pedestal engages said notch.

3. An alignment pedestal as recited in claim 2 wherein said front surface engages said front pedestal in a complimentary manner to said side pedestals to effect alignment of said optoelectronic device in an x,y, plane.

4. An alignment apparatus as recited in claim 1 wherein said substrate is monocrystalline material.

5. An alignment apparatus as recited in claim 1 wherein said optoelectronic device is a laser.

6. An alignment apparatus for passive alignment of an optoelectronic device to an optical waveguide comprising a substrate having first and second alignment pedestals on a top surface thereof; and optical waveguide disposed on said top surface; and optoelectronic device having a first side and a second side; and a notch having a non parallel angle relative to at least one of said sides, said notch for engaging said first alignment pedestal for aligning said optoelectronic device to said optical waveguide.

7. An apparatus as recited in claim 6 wherein said notch has a sawtooth configuration.

8. An apparatus as recited in claim 6 wherein said device has a front surface perpendicular to said first and second sides of said device and said second pedestal abuts said front surface.

9. An apparatus as recited in claim 6 wherein said waveguide is an optical fiber.

10. An apparatus as recited in claim 6 wherein said waveguide is a planar waveguide.

11. An apparatus as recited in claim 7 wherein said sawtooth configuration is repeated at least once over a cavity length of said optoelectronic device.

12. An apparatus as recited in claim 6 wherein said notch has a stair stepped pattern.

13. An alignment apparatus as recited in claim 4 wherein said optoelectronic device is a laser.

14. An alignment apparatus as recited in claim 3 wherein said substrate is monocrystalline material.

15. An alignment apparatus as recited in claim 14 wherein said optoelectronic device is a laser.

16. An apparatus as recited in claim 7 wherein said optoelectronic device is a laser.

17. An apparatus as recited in claim 8 wherein said waveguide is an optical fiber.

18. An apparatus as recited in claim 8 wherein said notch has a sawtooth configuration.

19. An apparatus as recited in claim 18 wherein said sawtooth configuration is repeated at least once over a cavity length of said optoelectronic device.

20. An apparatus as recited in claim 6 wherein said optoelectronic device is a laser.

21. An apparatus as recited in claim 6 wherein said substrate is monocrystalline material.

22. An apparatus as recited in claim 21 wherein said optoelectronic device is a laser.

* * * * *